United States Patent [19]

Uno et al.

[11] Patent Number: 4,480,546

[45] Date of Patent: Nov. 6, 1984

[54] APPARATUS FOR DETECTING DEFECTS OF PRINTING SHEETS USING ADJUSTABLE LENGTH ROTATABLE SECTOR

[75] Inventors: Chiyomatsu Uno, Koshigaya; Tamio Kuroda, Soka, both of Japan

[73] Assignee: Komori Printing Machinery Co., Inc., Azumabashi, Japan

[21] Appl. No.: 318,342

[22] Filed: Nov. 5, 1981

[30] Foreign Application Priority Data

Dec. 5, 1980 [JP] Japan ................................ 55-172212

[51] Int. Cl.[3] ........................ B41F 13/24; G01N 21/86

[52] U.S. Cl. ...................................... 101/248; 250/560

[58] Field of Search ................ 101/174, 248; 271/259, 271/261, 358; 250/557, 560, 562, 563, 571, 548, 206, 236, 223 R

[56] References Cited

U.S. PATENT DOCUMENTS

| | | | |
|---|---|---|---|
| 2,151,570 | 3/1939 | Shoults et al. | 250/560 |
| 3,232,547 | 2/1966 | Thiede et al. | 250/560 X |
| 3,312,829 | 4/1967 | Sprengers et al. | 250/236 |
| 3,528,094 | 9/1970 | Binks | 250/562 |
| 3,614,455 | 10/1971 | Paulus | 250/557 |
| 4,268,746 | 5/1981 | Schroeder | 250/223 R |
| 4,297,585 | 10/1981 | Puschmann | 250/560 |
| 4,298,807 | 11/1981 | Faure | 250/562 |
| 4,310,153 | 1/1982 | Kikuchi | 250/223 R |
| 4,317,138 | 2/1982 | Bryan et al. | 358/256 |
| 4,348,592 | 9/1982 | Kimura et al. | 250/560 |

FOREIGN PATENT DOCUMENTS

| | | | |
|---|---|---|---|
| 2011613 | 7/1979 | United Kingdom | 250/560 |

*Primary Examiner*—E. H. Eickholt

*Attorney, Agent, or Firm*—Thompson, Birch, Gauthier & Samuels

[57] ABSTRACT

Such defects as a folded back or bent portion and a notch along one or both side edges of a printing sheet is detected by a detector located on one or both sides of a front edge of a correctly fed printing sheet for detecting absence of the sheet and a timing signal generator which produces a timing signal while all length of the sheet passes by the detector. An output signal which stops printing operation is produced when the detector detects absence of the sheet while the timing signal is being produced. According to this invention it is possible to prevent formation of defective printed matter and damage of a printing press fed with defective printing sheets.

3 Claims, 9 Drawing Figures

(a) (b) (c)

APPARATUS FOR DETECTING DEFECTS OF PRINTING SHEETS USING ADJUSTABLE LENGTH ROTATABLE SECTOR

BACKGROUND OF THE INVENTION

This invention relates to apparatus for detecting bent, folded or broken portions of printing sheets immediately after commencing the printing operation.

Referring to FIG. 1 which shows a prior art sheet printing press, a printing sheet 1 fed from a sheet feeder 2 is stopped by a front register 3, and the position of the sheet is determined by the front register and side registers, not shown, by being drawn by a lateral needle 4. Then the sheet is clamped by jaws of a swinger 5 to be transferred to an impression cylinder 6, and then printed with a first color by a blanket cylinder 8 which is supplied with the printing ink from a plate cylinder 7. Then the printed sheet is transferred to a second printing unit comprising identical rollers through an intermediate cylinder 9 to be printed with a second color. After being printed with a plurality of colors, the printed sheet is transferred to a receiving cylinder 11 via a transfer cylinder 10 and then conveyed to a delivery device 13 by being clamped by jaws of a conveyor chain 12.

As shown in FIG. 2, a printing sheet 2 collides against front registers 3 to correctly position its front edge and is laterally drawn by a lateral needle 4, not shown in FIG. 2, to correct its lateral position. Usually, an incorrectly fed sheet is detected by a photoelectric detector, located a little short of the front registers 3. The photoelectric detector comprises two light emitting elements 14 located beneath the sheet 2 near its opposite sides and two light receiving elements 15 disposed oppositely to the light emitting elements 14. With this arrangement, since the light emitted by the light emitting elements 14 reaches the light receiving elements 15, when two superposed sheets are delivered simultaneously such improper sheet feeding alters the quantity of light transmitted. When the front edge of the sheet 2 does not reach the front registers 3, the light would be directly received by the light receiving elements 15 thus enabling them to detect improperly supplied sheet. Upon detection of such improperly fed sheet, the pay out operation of the sheet feeder 1 is stopped while at the same time the printing operation of the printing cylinder is prevented by displacing the same to an inoperative position, thus preventing improper printing.

Such photoelectric detectors can also detect a state in which one or both front corners of the sheet are drastically bent or folded back. However, since the photoelectric detectors are generally located at positions substantially remote from both side edges of the sheet, they can not detect a state in which front corners are bent or folded back only slightly. Even when three or more detectors are provided for a printing press, since the detectors are located apart from the side edges of the sheet, it is also impossible to detect slightly bent or folded back states at the corner.

The bent or folding back states at the corners are liable to be formed when sheets are stacked into another stack or when an automatic device for counting the number of sheets is used. Especially, as the sheet number counter sequentially turns up the corners of stacked sheets with a mechanical device, the chance of bending up the corners increases. Such corner bending up also occurs at the corners of the rear edge of the sheet. Further, the sheet often breaks at or is formed with notches intermediate points along the side edges thereof.

FIGS. 3*a*, 3*b* and 3*c* show abnormal states along the side edge of a sheet. In these Figures, arrows shown the direction of movement of the sheet. FIG. 3*a* shows a small bent up or folded back portion at the front end of one side, FIG. 3*b* shows a small bent up or folded back portion at the rear end of the same side, and FIG. 3*c* shows a small notch at an intermediate point of the same side.

Since these abnormal states can not be detected by the prior art photoelectric detectors of the type described above, such defective sheets would be printed thus forming defective printed sheets. Consequently it is necessary to visually examine completed books so as to check whether or not they contain defective printed sheets. This is not only troublesome but also books containing defective printed pages must be discarded. In an offset printing press the folded back portion applies a local excessive pressure to the blanket so that such local excessive pressure results in nonuniform printings for all succeeding sheets unless the blanket is replaced by a new one.

SUMMARY OF THE INVENTION

Accordingly, it is an object of this invention to provide an apparatus for accurately detecting defects at a corner or along a side edge of a printing sheet as for example a bent up or folded back corner portion or a notched side edge, thereby preventing formation of defective printed matter.

According to this invention there is provided apparatus for detecting defects at a side edge of a printing sheet comprising a detector at one side of a front edge of a correctly fed printing sheet for detecting presence or absence of the printing sheet, a detection timing means for producing a detection timing signal while all length of the printing sheet passes by the detector and means for producing an output signal when the detector detects absence of the printing sheet while the detection timing signal is being produced.

DESCRIPTION OF THE PREFERRED EMBODIMENTS

Figure 1:
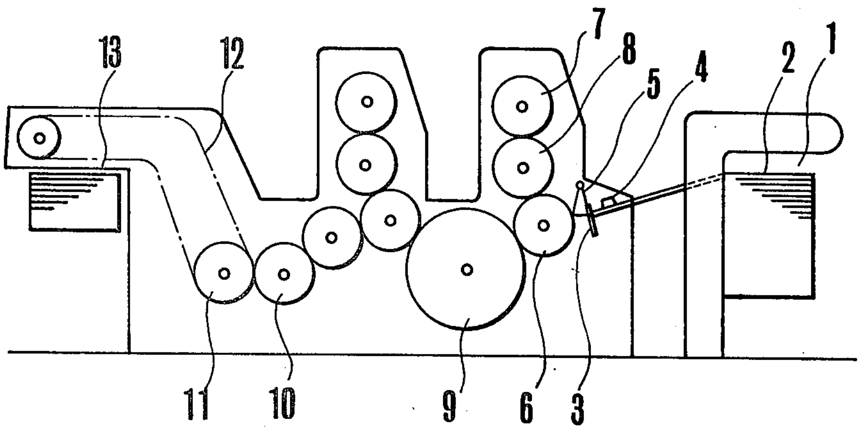
FIG.1 PRIOR ART
FIG. 1 is a diagrammatic side view of a prior art sheet printing press.
Figure 2:
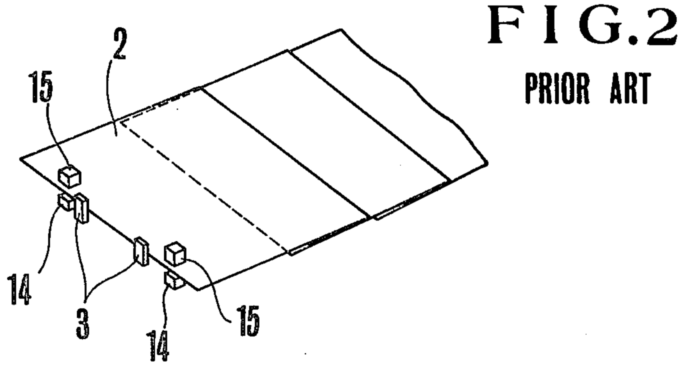
FIG.2 PRIOR ART
FIG. 2 is a perspective view showing prior art photoelectric detectors when a sheet of printing paper is correctly positioned by front and side registers.
Figure 3:
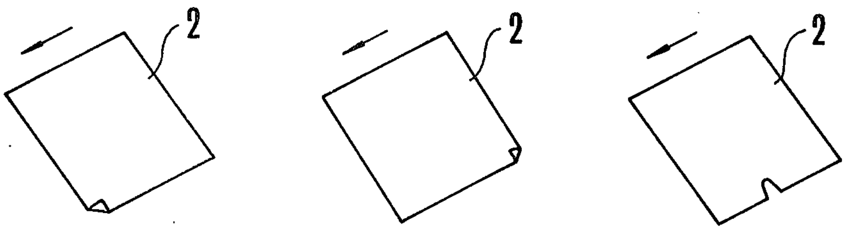
FIGS. 3*a*, 3*b* and 3*c* are perspective views showing various types of defective states of the sheet.
Figure 4:
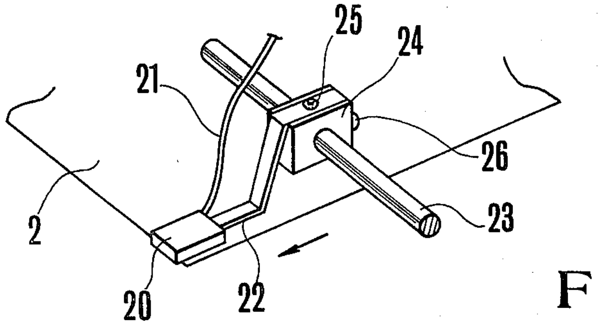
FIG. 4 is a perspective view showing one embodiment of the apparatus for detecting defects along a side edge of a printing sheet in accordance with the present invention.

In FIG. 4, it is assumed that a printing sheet 2 has been located at a correct position by a front register and a lateral needle as shown in FIG. 1. The detection apparatus shown in FIG. 4 comprises a detection sensor 20 positioned at the front end and at the lefthand side of the sheet 2 which is moved in the direction of the arrow. The sensor 20 is positioned a little above the sheet 2. The detection sensor 20 comprises a light projector which projects light downwardly toward the upper sheet surface and a light receiver which receives light reflected by the surface of the sheet 2 and produces its output signal via a lead wire 21, the output signal being produced when the light receiver does not receive any light meaning that the front corner of the sheet is bent up. The sensor 20 is secured to one end of a supporting lever 22 secured by a screw 25 to the upper surface of a supporting block 24 slidably mounted on a rod 23. The rod 23 is provided transversely above the path of the paper sheet 2. After adjusting the lateral position and the height of the detection sensor 20, the supporting block 24 is secured to the rod 23 by the screw 26 thus positioning the detection sensor 20. Usually, when about 20 mm of a corner of the sheet 2 is bent the bent portion enters into the printing press, thus resulting in a defective printed matter. For this reason, according to this invention, the sensor 20 is positioned so as to detect a corner bend larger than 18 mm. Although not shown, an identical detection sensor is mounted on the rod 23 to monitor the opposite front corner of the sheet.

Figure 5:
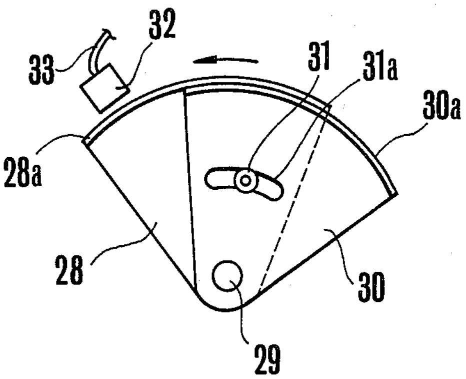
FIG. 5 is a front view showing a timing signal generator.

As shown in FIG. 5, the timing signal generator comprises a sector shaped detecting member 28 secured to a shaft 29 which is rotated in synchronism with the driving mechanism of the swinger so that the shaft 29 is rotated one revolution when the swinger makes one reciprocation, that is each sheet is printed. A second similar sector shaped detecting member 30 is also rotatably mounted on the rotary shaft 29 to overlap the detecting member 30 over any desired angle. The overlap angle of the two sector shaped members 28 and 30, that is the angle of the overlapped assembly can be adjusted by an arcurate slot 31*a* of the sector 30 and a fastening bolt 31 secured to the sector 28. A timing sensor 32 in the form of a proximity switch, for example, is provided to confront the peripheries 28 and 30*a* of the sector shaped detecting members 28 and 30. When the detecting members 28 and 30 are rotated in the counterclockwise direction the timing sensor 32 produces a timing signal while it faces the peripheries 28*a* and 30*a* and the generated timing signal is emitted through a lead wire 33. The relative position of the timing sensor 32 and the detecting members 28 and 30 is selected such that the timing signal is generated between an instant at which the front end of the sheet 2 passes by the detection sensor 20 as shown in FIG. 4 and an instant at which the rear end of the sheet 2 passes by the detection sensor 20. More particularly, when the front end of the sheet 2 confronts the detection sensor 20 the front edge of the periphery 28*a* faces the timing sensor 32, while when the rear end of the sheet 2 faces the detection sensor 20, the rear edge of the periphery 30*a* faces the timing sensor 32.

Figure 6:
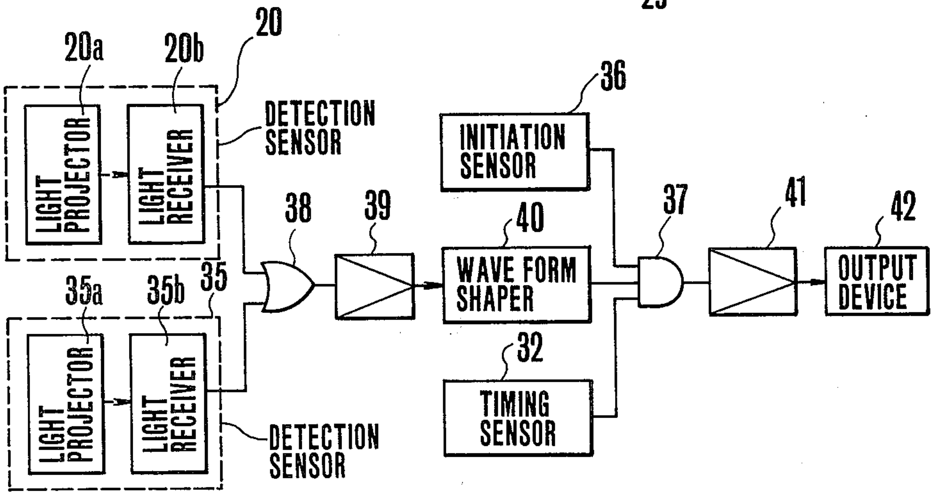
FIG. 6 is a block diagram showing the control circuit.

The operation of various signals will now be described. In the block diagram shown in FIG. 6, there are provided a detection sensor 35 disposed at the right front corner of the sheet and comprising a light projector 35*a* and a light receiver 35*b*, and an initiation sensor 36 which is started to operate when a first sheet comes to engage a front register and thereafter continues to emit an initiation signal until the printing operation is stopped. Accordingly, as soon as the printing operation is commenced, the initiation sensor 36 produces an initiation signal and when the sheet 2 passes by the detection sensors 20 and 35 the timing sensor 32 produces timing signals. In response to the initiation signal and the timing signals, an AND gate circuit 37 is enabled. When there is a folded or bent portion or a notch on the left or right side edges of the sheet, the detection sensor 20 or 35 produces a detection signal which is applied to an amplifier 39 via an OR gate circuit 38 and the waveform of the output of the amplifier 39 is shaped by a waveform shaper 40, the output thereof being amplified by an amplifier 41 and then applied to an output device 42 via the AND gate circuit 37. When supplied with the detection signal, the output device 42 self-holds its operative state and as the operation of the sheet feeder 1 is stopped it renders inoperative or throws off various cylinders and rollers of the printing press to terminate the printing operation. Concurrently therewith an alarm device is operated to signal that the sheet is defective.

Figure 7:
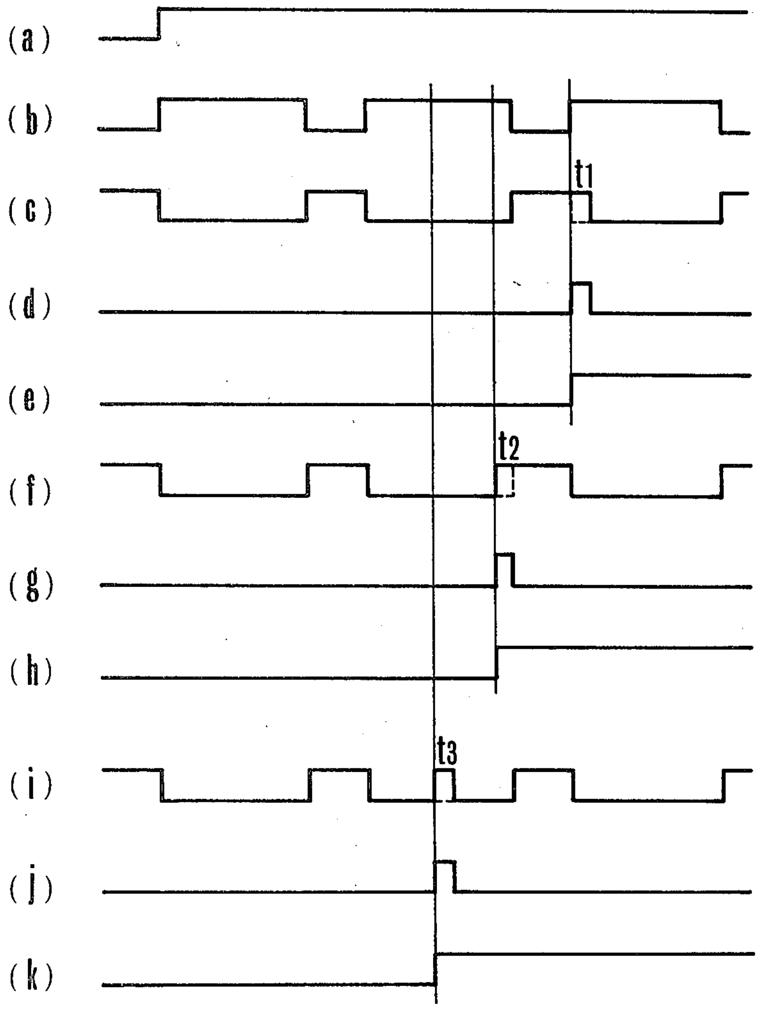
FIG. 7 is a timing chart showing various signals of the circuit shown in FIG. 6.

FIG. 7 is a timing chart showing various signals of the control circuit, in which curve (a) shows the initiation signal, (b) the detection timing signal, (c), (d) and (e) the detection signal, the output signal of the AND gate circuit 37 and the output signal of the output device 42 respectively, which are produced when a bent up or folded portion presents at the forward end of the sheet. Curves (f), (g) and (h) show the detection signal, the output signal of the AND gate circuit 37, and the output signal of the output device 42, respectively when bent or folded portion presents at the rear end of the sheet, whereas curves (i), (j) and (k) represent the detection signal, the output signal of the AND gate circuit 37, and the output signal of the output device 42 when there is a defect, for example a notch, at an intermediate point along one side edge of the sheet.

When there is a bent or folded portion at the front end of the third sheet, as shown by curve (c), a detection signal of this defect is produced at time t1 so that the AND gate circuit 37 immediately produces to operate the output device 42. In the same manner, when there is a bent or folded portion at the rear end of the second sheet, a detection signal of this defect is produced at time t2 as shown by curve (f), and where a notch is present at an intermediate point of one side edge of the second sheet a detection signal is produced at time t3 as shown by curve (i). In each a case, the AND gate circuit 37 immediately produces an output to operate the output device 42.

Although in the foregoing embodiment a reflected light detector was used as the detection sensor, it will be clear that a light detector that detects light transmitting through the sheet can also be used. Further, static capacitance type or ultra sonic type detection sensor may also be used.

Figure 8:
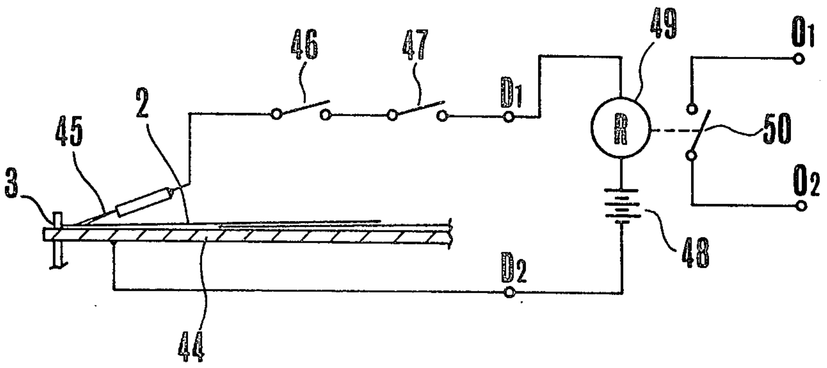
FIG. 8 is a connection diagram showing another embodiment according to this invention.

FIG. 8 shows the electric circuit of another embodiment of this invention in which a sheet 2 fed onto a metal feed plate 44 is correctly positioned by a front register 3 and a lateral needle 4 (see FIG. 1). When the sheet 2 is held in the correct position, the tips of metal rods 45 are made contact to the left and right sides of the front end of the sheet 2. Accordingly, when there is a bent or folded portion or a notch at either one of the front corners of the sheet 2, the metal rod 45 will come into electrical contact with the metal feed plate 44. Thus, the metal rods 45 and the feed plate 44 constitute a detection sensor. There are also provided an initiation switch 46 which is closed concurrently with the engagement of the first sheet against the front register 3 and held in the closed state during the printing operation, and a timing switch 47 comprising adjustable sector shaped detection members as shown in FIG. 5 which is held closed while the sector shaped detection members 28 and 30 are passed by the detection sensor 45. A series circuit including the feed plate 44, metal rods 45, the initiation switch 46, and the timing switch 47 is connected across detection terminals D1 and D2. A source of supply 48 and a relay 49 is connected in series across the output side of the terminals D1 and D2. When a bent or folded portion at the corner or a notch along the side edge of the sheet is detected when it passes by the metal rods, both switches 46 and 47 are closed so that the relay 49 is energized to close its contact 50 with the result that an operation output signal appears across output terminals O1 and O2.

Figure 9:
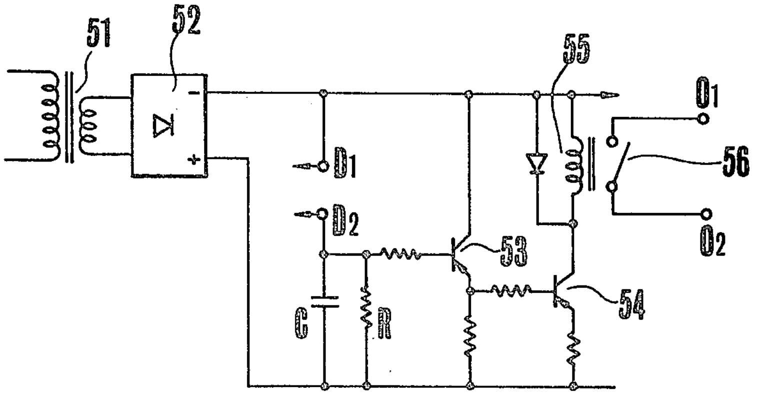
FIG. 9 is a connection diagram showing still another embodiment of this invention.

FIG. 9 shows another embodiment of this invention in which the voltage of an AC source is stepped down by a transformer 51 and then converted into a constant DC voltage by a rectifier 52. When a circuit between detection terminals D1 and D2 is closed like the embodiment shown in FIG. 8 a voltage is established after a predetermined time determined by a time constant circuit made up of a capacitor C and a register R to apply a positive voltage to the base electrode of a transistor 54, thus turning on the same. Consequently, a transistor 54 is also turned on to energize a relay 55 for closing its contact 56 whereby a driving output appears on the output terminals O1 and O2.

Although in the foregoing embodiments the detection sensors were provided on both sides of the front edge of the sheet, where a bent or folded portion or a notch occurs only along one side edge of the sheet, the detection sensor may be provided only on the left or right side of the sheet.

As above described, the apparatus for detecting the defects of a printing sheet according to this invention can efficiently detect such small defects such as a bent or folded portion or a notch at the side edge of the printing sheet. Thus it is possible to prevent beforehand formation of defective printed matter caused by such defects of the printing sheet. Further, as it is possible to prevent a defective printing sheet from entering into the printing press, defective printing of succeeding sheets can be effectively prevented. This also prevents wrapping up a defective sheet about a blanket cylinder, as well as damage of a blanket and printing press. In other words, it is possible to prevent formation of books containing defective pages.

What is claimed is:

1. Apparatus for detecting defects in the side edge of a moving printing sheet, comprising:

a detector for detecting the presence or absence of said printing sheet, said detector being positioned along the longitudinal path of travel of said side edge;

a detection timing means for producing a detection timing signal, said detection timing means having a rotatable sector shaped member with a variable length periphery defined by adjustably interconnected overlapped sectors, with a timing sensor disposed to face said periphery, said sensor being operable to produce said detection timing signal while said periphery passes thereby, and with the time required for said periphery to pass by said sensor corresponding to the time required for said side edge to pass by said detector; and means for producing an output signal when said detector detects absence of said printing sheet while said detection timing signal is being produced.

2. The apparatus according to claim 1 wherein said detector comprises light emitting means and light receiving means which receives light emitted by said light emitting means and transmitted through or reflected by said printing sheet.

3. Apparatus for detecting defects in the side edges of a moving printing sheet, comprising:

a pair of detectors for detecting the presence or absence of said printing sheet, said detectors being positioned respectively along the longitudinal paths of travel of said side edges;

a detection timing means for producing a detection timing signal, said detection timing means having a rotatable sector shaped member with a variable length periphery defined by adjustably interconnected overlapped sectors, with a timing sensor disposed to face said periphery, said sensor being operable to produce said detection timing signal while said periphery passes thereby, and with the time required for said periphery to pass by said sensor corresponding to the time required for said side edges to pass by said detectors; and means for producing an output signal when either of said detectors detects absence of said printing sheet while said detection timing signal is being produced.

* * * * *